United States Patent Office 2,774,703
Patented Dec. 18, 1956

2,774,703

RUBBER-FABRIC LAMINATES AND BONDING AGENT THEREFOR

William B. Reynolds, Bartlesville, Okla., assignor to Phillips Petroleum Company, a corporation of Delaware No Drawing. Application January 5, 1953,
Serial No. 329,721

25 Claims. (Cl. 154—139)

This invention relates to rubber-fabric laminates. In a further aspect this invention relates to a particular bonding agent for producing these laminates and the process of preparing these bonding agents. In a further aspect this invention relates to the production of rubber-fabric laminates utilizing, as the bonding agent, an aqueous solution of a copolymer of a conjugated diene with acrylic acid or methacrylic acid. In a further aspect this invention relates to the production of rubber-fabric laminates using a bonding agent comprising an aqueous solution of a copolymer, said copolymer being precipitated in the fabric following the impregnation of the fabric by this solution. In a further aspect this invention relates to the manufacture of rubber tires wherein a strong rubber-fabric bond is provided.

Various materials have been suggested as bonding agents for the production of laminated articles. These include rubber latex and/or reclaimed rubber dispersions, which have been used as treating materials for bonding rubber to fabric in the making of tires, belts, and the like. Furthermore, resinous materials, such as phenol-formaldehyde resins, have been added to rubber latex and reclaimed rubbed dispersions. Rubber latices or dispersions contain relatively large rubber particles and, when used as bonding agents, coat the surface of the material treated. When the treated cord or fabric is brought into contact with rubber and the vulcanization then effected, a bond is formed between the rubber and the bonding agent which, in turn, has already formed a bond with the tire cord or fabric. Bonds formed in this manner have not been entirely satisfactory, particularly in tire manufacture, since there is a tendency for the cord to separate from the rubber as the tire is subjected to constant flexing in service.

Each of the following objects is obtained by at least one of the aspects of this invention.

An object of this invention is to produce rubber-fabric laminates. A further object of this invention is to provide a bonding agent for use in these laminates. A further object of this invention is to provide a method for the production of these bonding agents. A further object of this invention is to provide a process of preparing rubber-fabric laminates wherein the fabric is treated with an aqueous bonding solution. A further object of this invention is to provide bonding agents comprising aqueous solutions of copolymers prepared from conjugated dienes and acrylic acid or methacryclic acid. A further object of this invention is to provide automobile tires utilizing a bonding agent comprising an aqueous solution of these copolymers. A further object of this invention is to provide a process for making automobile tires comprising applying an aqueous solution of a butadiene/acrylic acid or butadiene/methacrylic acid copolymer to the fabric, precipitating the polymer in the cord, applying a layer of rubber to the fabric, and vulcanizing the completed tire.

Other objects and advantages of this invention will be apparent to one skilled in the art upon reading the accompanying disclosure.

The term "rubber," when used in this disclosure, without a qualifying adjective, includes both natural and synthetic rubber.

I have discovered that superior rubber-fabric laminates may be produced by using an aqueous solution of the particular bonding agent of this invention. The use of an aqueous solution represents a definite advance in this art because, upon contact, the water present penetrates and swells the fiber which, in turn, facilitates entry of the bonding agent into the interior of the fiber. After bringing the rubber into contact with the treated cord and vulcanizing it, an exceptionally strong rubber-to-fabric bond is obtained.

Organic solvents have been used to dissolve bonding agents but such solvents do not penetrate and swell the fiber as does water. An additional advantage of an aqueous solution, instead of a latex which is sometimes employed, is that it does not contain material such as emulsifying agents, salts, and other ingredients employed in the polymerization recipe, and consequently are present in the latex. These materials, and in particular the emulsifying agents, have certain deleterious effects. Finally, because of the swelling effect of the aqueous solution, there is a better contact of the treating material with the fabric using the process of my invention.

The polymeric materials employed as bonding agents are copolymers of conjugated dienes with a copolymerizable material selected from the group consisting of acrylic and methacrylic acids. The conjugated dienes employed are preferably those which contain four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule are also applicable. Furthermore, various alkoxy, such as methoxy and ethoxy, and cyano derivatives of these conjugated dienes can also be used. It is to be understood that mixtures of various conjugated dienes and mixtures of acrylic and methacrylic acids can be employed in the practice of the invention.

When preparing the conjugated diene-acrylic and methacrylic acid copolymers, at least 10 percent by weight of the monomeric material is the conjugated diene component. The minimum amount of the acrylic acid or methacrylic acid is controlled by the amount required to produce a copolymer which is soluble in aqueous alkaline solution. This component generally comprises at least 20 percent by weight of the monomeric material although in some instances a smaller quantity is used. Generally the amount of conjugated diene component is in the range between 10 and 80 parts by weight, and the acrylic or methacrylic acid component is in the range between 90 and 20 parts by weight, per 100 parts of monomeric material. The ranges most frequently preferred are 50 to 75 parts by weight of conjugated diene component and 50 to 25 parts by weight of acrylic or methacrylic acid component.

The conjugated diene-acrylic or methacrylic acid copolymers herein described can be produced by methods known to the art and can range from liquids to hard rubbery polymers.

For the preparation of the rubber-fabric laminates in accordance with the process of this invention, the polymeric materials to be used as bonding agents are first dissolved in an aqueous solution of an alkaline material. The procedure employed for dissolving the polymer is governed by the concentration of the solution that it is desired to prepare, the particular alkaline material used, and the polymer being dissolved. Solutions containing a concentration of polymer around two percent by weight and below are, in general, fairly easy to prepare and are of low viscosity, while those of higher concentration, such as those containing five percent by weight and higher, are frequently quite viscous.

In one method of preparing an aqueous solution of the polymer, an alkaline solution of the desired concentration is prepared first, the polymer is added, and the mixture is agitated until solution is effected. Sometimes a more concentrated solution of the alkaline material is employed than is desired in the final solution. After the polymer is dissolved, the solution is diluted to the desired concentration. Frequently, during treatment with the alkaline material, the polymer mixture is heated to facilitate solution. In instances where a liquid alkaline material, such as an amine, is used, the polymer can be treated with the amine and the mixture then diluted prior to use. In other instances where a solid alkaline material, such as an alkali metal carbonate or bicarbonate, is employed, it can be milled into the polymer and then mixed with water to give a solution of the desired concentration. Regardless of the concentration of alkaline material employed, the polymer dissolves with the formation of a carboxylic acid salt.

It is sometimes desirable to include an organic solvent with the water and alkaline material, particularly a water-miscible organic solvent such as methyl, ethyl, propyl, isopropyl, or tert-butyl alcohol, ethylene glycol, Carbitol (monoethyl ether of diethylene glycol), Cellosolve (monoethyl ether of ethylene glycol), glycerol, erythritol, or dioxane. Such auxiliary solvents are particularly useful when preparing polymer solutions of around five percent by weight and higher. Through the use of these organic solvents, polymer solutions of fairly high concentrations but low viscosity are readily obtained. These organic solvents are also particularly useful when dissolving polymers containing relatively large amounts of the conjugated diene component. In general, as the amount of the conjugated diene component is increased, the polymer becomes increasingly difficult to dissolve.

Alkaline materials which are applicable include alkali metal hydroxides, alkali metal carbonates, alkali metal bicarbonates, ammonia, amines and the like. Of the alkali metal compounds which are operable, those of sodium and potassium are most frequently preferred. In general the preferred amines are the lower molecular weight aliphatic amines such as methyl amine, ethyl amine, and dimethyl amine. Also suitable are quaternary ammonium salts, and in general, compounds having a basic effect such as benzyl trimethyl ammonium hydroxide.

The amount of alkaline material employed when preparing the polymer solutions need be only that which is necessary to effect solution. As the ratio of the acrylic or methacrylic acid component to the conjugated diene component in the copolymer is increased, less alkaline material is required to effect solution, other factors being kept constant. Generally the amount of alkaline material is in the range between 0.25 and 25 stoichiometric equivalents per carboxy group in the copolymer. Polymer solutions generally range in concentration between 0.5 and 15 percent by weight. However, in instances where solutions of higher concentration can be prepared, they are applicable.

The alkalinity of the polymer solution is regulated so that the fabric or tire cord being treated will not be harmed. The pH is preferably in the range between 7.5 and 11.5.

Tire cord or fabric to be treated in accordance with the present invention is passed through an aqueous alkaline solution of the polymer, squeezed to remove excess solution, and then passed through an acid bath to precipitate the polymer in the fiber. It is then rinsed to remove excess acid and dried. The temperature of the alkaline treating operation can be varied over a wide range, any temperature just above the freezing point of the mixture up to around 180° F. or even higher being applicable. It is frequently desirable to operate at a fairly high temperature.

Any water soluble acid can be used in the acid bath. The function of the acid is to convert the polymer salt to the free acid, i. e., the carboxylic acid form of the polymer. Saturated and unsaturated aliphatic monobasic and dibasic organic acids as well as mineral acids are applicable. Representative organic acids which can be used include formic, acetic, propionic, butyric, oxalic, malonic, malic, succinic, glutaric, glycolic, chloroacetic, dichloroacetic, and trichloroacetic. The mineral acids include hydrochloric, sulfuric, nitric, and phosphoric acids. The acid solution must be of such concentration that it will not harm the fabric or tire cord being treated. The pH of the solution is preferably in the range between 2 and 6.

Instead of using an acid treating bath as described above, an aqueous acid solution of a copolymer of a conjugated diene with a vinyl heterocyclic nitrogen base, such as is described in my copending application, Serial No. 329,722, filed January 5, 1953, can be employed. In this case a poly salt, i. e., a salt formed by the reaction of a basic polymer with an acidic polymer, is precipitated in the fiber. If desired, the fabric can be treated with an aqueous acid solution of a conjugated diene-vinyl heterocyclic nitrogen base copolymer first and then with an aqueous alkaline solution of a conjugated diene-acrylic or methacrylic acid copolymer.

A solution of a resin-forming material, such as a phenolic compound and an aldehyde, e. g., resorcinol and formaldehyde, is sometimes added to the aqueous alkaline solution of the copolymer although this material is not necessary to the successful operation of the invention. Generally the alkaline mixture is allowed to stand several hours to permit an initial condensation to take place between the phenolic compound and the aldehyde. Other additives can also be employed if desired.

Following the cord treating or dipping operation, a rubber composition such as a tire carcass composition is calendered onto the fabric and then vulcanized. An exceptionally strong bond between the rubber and fabric is formed.

The process of this invention is particularly valuable for bonding cotton and rayon to natural and synthetic rubbers to be used in the manufacture of tires, belts, and the like. The process is also operable for bonding nylon, Orlon, and Dacron to rubber.

*Specific examples*

Butadiene was copolymerized with acrylic acid at 41° F. in accordance with the following emulsion polymerization recipe:

| | Parts by weight |
|---|---|
| Butadiene | 70 |
| Acrylic acid | 30 |
| Water | 180 |
| Duponol ME [1] | 4 |
| Tert-dodecyl mercaptan | Variable |
| Tert-butylisopropylbenzene hydroperoxide | 0.115 |
| KCl | 0.1 |
| FeSO$_4$.7H$_2$O | 0.139 |
| K$_4$P$_2$O$_7$ | 0.165 |

[1] Sodium lauryl sulfate.

Three runs were made using different amounts of mercaptan. The amounts of mercaptan, time-conversion data, and Mooney values were as follows:

| Run No. | Tert-C$_{12}$ Mercaptan, Parts by Weight | Time, Hours | Conversion, Percent | Mooney Value, ML-4 |
| --- | --- | --- | --- | --- |
| 1 | 0.4 | 3.6 | 64 | 71 |
| 2 | 0.45 | 3.6 | 66 | 56 |
| 3 | 0.5 | 3.6 | 62 | 42 |

A blend was prepared using 35 grams of the polymer from run 1 and 80 grams of a previous blend of equal parts of polymers from runs 2 and 3. The Mooney value (ML-4) of the final blend was 58.

One hundred ten grams of the polymer blend was put into water containing 28.4 grams of 86.1 percent KOH. The quantity of KOH was calculated to neutralize 95 percent of the carboxy groups present in the polymer, assuming that the polymer contained the same ratio of monomeric materials as the charging ratio. The mixture was heated at a temperature around the boiling point and stirred for approximately three hours after which it was filtered through an 80 mesh screen to remove a small amount of undissolved material. After standing approximately 16 hours, the solution was again filtered, this time through a No. 1 filter paper. A solution having a pH of 9.55 and containing 11 percent by weight of polymer was obtained.

Rayon tire cord is dipped into the aqueous alkaline solution of the butadiene-acrylic acid copolymer prepared as described above, at a temperature of approximately 75–90° F., squeezed to remove surplus solution, passed through a bath of dilute acetic acid, rinsed to remove excess acid, and dried in a forced air oven at a temperature of 150–212° F. The treated cord is then incorporated into a carcass rubber composition and vulcanized using an H adhesion mold, such as described in India Rubber World, 114, 213, (1946). The resulting composite structure gives an exceptionally strong rubber-to-fabric bond.

While the invention has been described in connection with a present, preferred embodiment thereof, it is to be understood that this description is illustrative only and is not intended to limit the invention.

I claim:

1. A process of preparing a bonding agent for bonding rubber to fabric prepared from organic fibers comprising copolymerizing a mixture consisting essentially of at least one conjugated diene with at least one acid selected from the group consisting of acrylic and methacrylic acids, said conjugated diene component comprising at least 10 percent by weight of the monomeric mixture and dissolving the resulting copolymer in an aqueous alkaline solution, said copolymer comprising at least 0.5 weight percent of said solution.

2. The process of claim 1 in which an organic solvent is used in addition to said aqueous solvent.

3. The process of claim 1 in which the alkaline material in said aqueous alkaline solution is selected from the group consisting of alkali metal hydroxides, alkali metal carbonates, alkali metal bicarbonates, ammonia, and amines.

4. The process of claim 1 in which said conjugated diene is butadiene and said acid is acrylic acid.

5. As a bonding agent, for bonding rubber to fabric prepared from organic fibers an aqueous alkaline solution containing at least 0.5 weight per cent of a copolymer prepared by polymerizing a mixture consisting essentially of a conjugated diene and an acid selected from the group consisting of acrylic and methacrylic acid, said conjugated diene comprising at least 10 parts by weight per 100 parts of the monomeric mixture.

6. The bonding agent of claim 5 in which said conjugated diene contains 4 to 6 carbon atoms.

7. The bonding agent of claim 5 in which said conjugated diene is butadiene and said acid is acrylic acid.

8. The bonding agent of claim 5 in which the alkaline material in said aqueous alkaline solution is selected from the group consisting of alkali metal hydroxides, alkali metal carbonates, alkali metal bicarbonates, ammonia, and amines.

9. The bonding agent of claim 5 in which an organic solvent is present in addition to said aqueous solvent.

10. The bonding agent of claim 5 in which the amount of alkaline material in said solution is between 0.25 and 25 stoichiometric equivalents per carboxy group in the polymer.

11. The bonding agent of claim 5 in which the pH of the solution is maintained between 7.5 and 11.5.

12. The bonding agent of claim 5 in which said copolymer is prepared using a monomer ratio containing 50 to 75 percent by weight of said conjugated diene.

13. As a bonding agent, for bonding rubber to fabric prepared from organic fibers a composition containing an aqueous solution of a 70/30 butadiene/acrylic acid copolymer, KOH to neutralize 95 percent of the carboxy groups in said copolymer, said copolymer comprising 11 percent by weight of said solution.

14. A laminate comprising at least one fabric element prepared from organic fibers and a layer of rubber attached thereto, the elements of said laminate having been bonded by means of a bonding agent comprising an aqueous alkaline solution containing at least 0.5 weight percent of a copolymer prepared by polymerizing a mixture consisting essentially of a conjugated diene and an acid selected from the group consisting of acrylic and methacrylic acid, said conjugated diene comprising at least 10 parts by weight per 100 parts of the monomeric mixture.

15. The laminate of claim 14 in which said conjugated diene contains 4 to 6 carbon atoms.

16. The laminate of claim 14 in which said conjugated diene is butadiene and said acid is acrylic acid.

17. A process of preparing a rubber-fabric laminate comprising treating fabric prepared from organic fibers with an aqueous alkaline solution containing at least 0.5 weight percent of a copolymer prepared by polymerizing a mixture consisting essentially of a conjugated diene and an acid selected from the group consisting of acrylic and methacrylic acid, said conjugated diene comprising at least 10 parts by weight per 100 parts of the monomeric mixture, contacting the thus treated fabric with an acid solution to precipitate the polymer in the fabric, applying a layer of rubber thereto, and heating the resulting laminate to vulcanize said rubber and to form a strong rubber-to-fabric bond.

18. The process of claim 17 in which said acid solution contains an acid selected from the group consisting of water-soluble saturated and unsaturated aliphatic monobasic and dibasic organic acids and mineral acids.

19. The process of claim 18 in which the pH of the acid solution is in the range of 2 to 6.

20. The process of claim 17 in which said conjugated diene is butadiene and said acid is acrylic acid.

21. The process of claim 17 in which the pH of the polymer solution is maintained between 7.5 and 11.5.

22. A process of preparing a bonding agent for bonding rubber to fabrics prepared from organic fibers comprising copolymerizing a monomeric mixture consisting essentially of at least one conjugated diene with at least one acid selected from the group consisting of acrylic and methacrylic acids, the conjugated diene component of said mixture comprising 10 to 80 percent by weight of said monomeric mixture, and dissolving the resulting copolymer in an aqueous alkaline solution, said copolymer comprising 0.5 to 15 percent by weight of said solution.

23. As a bonding agent for bonding rubber to fabric prepared from organic fibers, an aqueous alkaline solution containing 0.5 to 15 percent of a copolymer prepared from a monomeric mixture consisting essentially of a conjugated diene and an acid selected from the group consisting of acrylic and methacrylic acid, said conjugated diene comprising 10 to 80 percent of the monomeric material.

24. A laminate comprising at least one fabric element prepared from organic fibers and a layer of rubber attached thereto, the elements of said laminate having been bonded by means of a bonding agent comprising an aqueous alkaline solution containing 0.5 to 15 percent by weight of a copolymer prepared by polymerizing a mixture of 10 to 80 parts by weight per 100 parts of monomers and 90 to 20 parts by weight of an acid selected from the group consisting of acrylic and methacrylic acid.

25. A process of preparing a rubber-fabric laminate comprising treating the fabric with an aqueous alkaline solution containing 0.5 to 15 percent by weight of a copolymer prepared by polymerizing a mixture of 10 to 80 parts by weight per 100 parts of monomers of a conjugated diene and 90 to 20 parts by weight of an acid selected from the group consisting of acrylic and methacrylic acid, contacting the thus treated fabric with an acid solution to precipitate the polymer in the fabric, applying a layer of rubber thereto, and heating the resulting laminate to vulcanize said rubber and to form a strong rubber-to-fabric bond.

References Cited in the file of this patent
UNITED STATES PATENTS

| | | |
|---|---|---|
| 2,385,110 | Seymour et al. | Sept. 18, 1945 |
| 2,604,668 | Miller et al. | July 29, 1952 |
| 2,619,477 | Banes et al. | Nov. 25, 1952 |
| 2,692,841 | Frank et al. | Oct. 26, 1954 |
| 2,698,318 | Brown | Dec. 28, 1954 |
| 2,710,292 | Brown | June 7, 1955 |